US012785831B2

(12) United States Patent
Uchida et al.

(10) Patent No.: US 12,785,831 B2
(45) Date of Patent: Nov. 3, 2026

(54) ELECTRONIC APPARATUS AND SYSTEM

(71) Applicant: KABUSHIKI KAISHA TOSHIBA, Tokyo (JP)

(72) Inventors: Daisuke Uchida, Kawasaki Kanagawa (JP); Tatsuma Hirano, Kawasaki Kanagawa (JP); Satoshi Takaya, Kawasaki Kanagawa (JP); Tomoya Tandai, Tokyo (JP); Hiroyuki Nishikawa, Iruma Saitama (JP)

(73) Assignee: KABUSHIKI KAISHA TOSHIBA, Kawasaki (JP)

( * ) Notice: Subject to any disclaimer, the term of this patent is extended or adjusted under 35 U.S.C. 154(b) by 302 days.

(21) Appl. No.: 18/591,387

(22) Filed: Feb. 29, 2024

(65) Prior Publication Data

US 2024/0204893 A1 Jun. 20, 2024

Related U.S. Application Data

(63) Continuation of application No. PCT/JP2022/033710, filed on Sep. 8, 2022.

(30) Foreign Application Priority Data

Oct. 7, 2021 (JP) ................................ 2021-165634

(51) Int. Cl.
*H04B 17/391* (2015.01)
*H04B 17/309* (2015.01)
*H04B 17/318* (2015.01)

(52) U.S. Cl.
CPC ....... *H04B 17/3912* (2015.01); *H04B 17/318* (2015.01); *H04B 17/347* (2023.05)

(58) Field of Classification Search
CPC .............. H04B 17/3912; H04B 17/318; H04B 17/347; H04W 16/18
See application file for complete search history.

(56) References Cited

U.S. PATENT DOCUMENTS

2019/0068299 A1* 2/2019 Ikeda ...................... G06T 11/26
2020/0322758 A1* 10/2020 Kosugi ..................... G01S 5/14
(Continued)

FOREIGN PATENT DOCUMENTS

JP 2006279719 A 10/2006
JP 2016504827 A 2/2016
(Continued)

OTHER PUBLICATIONS

International Search Report (ISR) dated Nov. 1, 2022, issued in International Application No. PCT/JP2022/033710.
(Continued)

*Primary Examiner* — Fred A Casca
(74) *Attorney, Agent, or Firm* — Holtz, Holtz & Volek PC

(57) ABSTRACT

According to one embodiment, an electronic apparatus includes a processor. The processor generates data of a missing part on a radio wave map to which data relating to received power of a radio signal at points in a predetermined geographical range is mapped based on a status of a propagation path between a first wireless device configured to travel in the predetermined geographical range and a second wireless device configured to form a wireless communication area including the predetermined geographical range.

13 Claims, 15 Drawing Sheets

(56) References Cited

U.S. PATENT DOCUMENTS

| | | | | |
|---|---|---|---|---|
| 2020/0371192 | A1* | 11/2020 | Khan .................. | G01S 5/02526 |
| 2020/0374736 | A1 | 11/2020 | Fukuta et al. | |
| 2020/0400776 | A1 | 12/2020 | Sotoyama et al. | |
| 2021/0367691 | A1 | 11/2021 | Miyatake et al. | |

FOREIGN PATENT DOCUMENTS

| | | | |
|---|---|---|---|
| JP | 2019047259 | A | 3/2019 |
| JP | 2019140585 | A | 8/2019 |
| JP | 2019158864 | A | 9/2019 |
| JP | 2019195145 | A | 11/2019 |
| WO | 2014082048 | A1 | 5/2014 |
| WO | 2019160083 | A1 | 8/2019 |

OTHER PUBLICATIONS

Written Opinion (WO) dated Nov. 1, 2022, issued in International Application No. PCT/JP2022/033710.

Imai, "Mobile Radio Propagation", The Journal of The Institute of Image Information and Television Engineers (vol. 70, No. 11), 2016, pp. 910-916, DOI: 10.3169/itej.70.910.

Narzullaev, et al., "A fast and accurate calibration algorithm for real-time locating systems based on the received signal strength indication", AEU—International Journal of Electronics and Communications (vol. 65, No. 4), 2011, pp. 305-311, DOI: 10.1016/j.aeue.2010.03.012.

Sato, et al., "A Study on Radio Map Construction via Frequency-Space Interpolation", Proceedings of the 2020 IEICE General Conference, 2020, p. 547.

* cited by examiner

| | | | | | | | | | | | | | | |
|---|---|---|---|---|---|---|---|---|---|---|---|---|---|---|
| -28.0 | -31.0 | -35.0 | -38.0 | -40.3 | -42.2 | -43.7 | -45.0 | -46.1 | -47.1 | -48.0 | -48.9 | -49.6 | -50.3 | -50.9 |
| -34.0 | -35.0 | | | | | -44.0 | -45.2 | -46.3 | -47.3 | -48.2 | -49.0 | -49.7 | -50.4 | -51.0 |
| -37.5 | -38.0 | -39.1 | -40.6 | | -43.3 | -44.5 | -45.6 | -46.6 | -47.5 | | | | | -51.1 |
| -40.0 | -40.3 | -41.0 | -42.0 | -43.1 | -44.1 | -45.2 | -46.1 | | -47.9 | -48.6 | -49.4 | -50.0 | -50.7 | |
| -42.0 | -42.2 | -42.6 | | | | | | -47.5 | -48.3 | -49.0 | -49.6 | -50.3 | -50.9 | -51.4 |
| | | -44.0 | -44.5 | -45.2 | -45.9 | -46.6 | -47.3 | -48.0 | -48.7 | | | -50.6 | -51.1 | -51.7 |
| | | -45.2 | -45.6 | -46.1 | -46.7 | -47.3 | -47.9 | -48.5 | -49.1 | -49.7 | -50.3 | -50.9 | -51.4 | -51.9 |
| -46.1 | -46.1 | -46.3 | | -47.0 | -47.5 | -48.0 | | -49.1 | -49.6 | -50.2 | | -51.2 | -51.7 | -52.2 |
| -47.1 | -47.1 | -47.3 | -47.5 | -47.9 | -48.3 | -48.7 | | -49.6 | -50.1 | -50.6 | -51.1 | -51.5 | -52.0 | -52.4 |
| -48.0 | | -48.2 | -48.4 | -48.6 | -49.0 | -49.3 | | -50.2 | -50.6 | -51.0 | -51.4 | -51.9 | -52.3 | -52.7 |
| -48.8 | -48.9 | -49.0 | -49.1 | -49.4 | -49.6 | -50.0 | -50.3 | -50.7 | | -51.4 | -51.8 | -52.2 | -52.6 | -53.0 |
| -49.6 | -49.6 | | | | -50.3 | -50.6 | -50.9 | -51.2 | -51.5 | -51.9 | -52.2 | -52.6 | -53.0 | -53.3 |
| -50.3 | -50.3 | -50.4 | -50.5 | -50.7 | -50.9 | -51.1 | -51.4 | -51.7 | | | | -53.0 | -53.3 | -53.6 |
| -50.9 | | -51.0 | -51.1 | -51.3 | -51.4 | -51.7 | -51.9 | -52.2 | -52.4 | -52.7 | -53.0 | -53.3 | -53.6 | |

FIG. 4

| | | | | | | | | | | | | | | |
|---|---|---|---|---|---|---|---|---|---|---|---|---|---|---|
| -28.9 | -31.0 | -30.1 | -36.1 | -43.8 | -37.4 | -43.7 | -44.4 | -41.7 | -46.9 | -49.6 | -46.8 | -50.1 | -50.9 | -45.4 |
| -29.6 | -27.7 | -34.8 | -30.5 | -41.0 | -37.0 | -44.5 | -44.5 | -45.0 | -49.3 | -45.5 | -44.0 | -51.3 | -53.1 | -53.3 |
| -39.5 | -40.4 | 42.4 | -43.4 | -44.8 | -35.3 | -36.6 | -40.9 | -47.4 | -42.2 | -44.6 | -47.1 | -41.8 | -45.3 | -45.4 |
| -34.9 | -35.2 | -35.7 | -37.1 | -41.2 | -38.4 | -43.4 | -46.3 | -48.9 | -48.2 | -41.8 | -54.5 | -44.1 | -56.5 | -55.7 |
| -40.0 | -38.3 | -43.1 | -45.6 | -39.9 | -42.4 | -48.6 | -41.3 | -50.2 | -50.8 | -44.4 | -49.0 | -50.1 | -53.1 | -50.5 |
| -36.2 | -37.7 | -38.6 | -43.2 | -45.8 | -48.4 | -45.5 | -43.5 | -47.2 | -45.5 | -48.3 | -43.7 | -48.1 | -49.7 | -49.9 |
| -48.0 | -44.9 | -45.9 | -41.7 | -45.8 | -50.6 | -48.7 | -52.6 | -46.4 | -51.7 | -49.7 | -52.4 | -48.8 | -46.6 | -47.7 |
| -48.8 | -39.0 | -50.2 | -41.3 | -45.7 | -47.3 | -46.8 | -52.9 | -51.7 | -53.3 | -48.1 | -53.6 | -48.5 | -47.0 | -51.6 |
| -43.4 | -48.8 | -52.2 | -47.0 | -41.5 | -49.4 | -41.8 | -41.3 | -47.2 | -47.8 | -50.2 | -45.4 | -47.2 | -48.0 | -48.2 |
| -42.2 | -43.6 | -42.2 | -52.1 | -45.6 | -41.7 | -46.0 | -46.9 | -44.6 | -53.0 | -46.6 | -48.1 | -51.8 | -53.5 | -53.1 |
| -48.0 | -52.6 | -50.3 | -49.4 | -46.1 | -44.6 | -43.9 | -49.2 | -51.6 | -53.6 | -50.6 | -55.2 | -49.9 | -53.2 | -49.2 |
| -49.3 | -49.2 | -50.9 | -52.7 | -49.8 | -47.1 | -46.6 | -48.0 | -53.0 | -43.5 | -54.8 | -50.7 | -47.0 | -49.3 | -54.6 |
| -47.0 | -49.2 | -53.6 | -53.2 | -51.6 | -49.6 | -51.2 | -46.0 | -45.0 | -47.9 | -47.2 | -53.0 | -51.1 | -51.3 | -50.6 |
| -46.7 | -47.5 | -53.7 | -53.8 | -55.5 | -52.7 | -50.5 | -44.0 | -51.9 | -47.8 | -48.2 | -51.2 | -45.9 | -49.8 | -57.2 |

FIG. 5

| | | | | | | | | | | | | | | |
|---|---|---|---|---|---|---|---|---|---|---|---|---|---|---|
| -28.9 | -31.0 | -30.1 | -36.1 | -43.8 | -37.4 | -43.7 | -44.4 | -41.7 | -46.9 | -49.6 | -46.8 | -50.1 | -50.9 | -45.4 |
| -29.6 | -27.7 | -34.8 | | -41.0 | -37.0 | -44.5 | | -45.0 | -49.3 | -45.5 | -44.0 | -51.3 | -53.1 | -53.3 |
| -39.5 | | 42.4 | -43.4 | -44.8 | -35.3 | -36.6 | -40.9 | -47.4 | -42.2 | -44.6 | -47.1 | -41.8 | | -45.4 |
| -34.9 | -35.2 | -35.7 | -37.1 | -41.2 | -38.4 | -43.4 | -46.3 | -48.9 | -48.2 | -41.8 | -54.5 | -44.1 | -56.5 | -55.7 |
| -40.0 | -38.3 | | | -39.9 | -42.4 | -48.6 | -41.3 | -50.2 | | | -49.0 | -50.1 | -53.1 | -50.5 |
| -36.2 | -37.7 | | | -45.8 | -48.4 | -45.5 | -43.5 | -47.2 | -45.5 | -48.3 | -43.7 | -48.1 | -49.7 | -49.9 |
| -48.0 | -44.9 | -45.9 | -41.7 | -45.8 | -50.6 | -48.7 | -52.6 | -46.4 | -51.7 | -49.7 | -52.4 | -48.8 | | -47.7 |
| -48.8 | -39.0 | -50.2 | -41.3 | -45.7 | -47.3 | | -52.9 | | | | | -48.5 | -47.0 | -51.6 |
| -43.4 | -48.8 | -52.2 | | -41.5 | -49.4 | -41.8 | -41.3 | -47.2 | -47.8 | -50.2 | -45.4 | -47.2 | -48.0 | -48.2 |
| -42.2 | -43.6 | -42.2 | -52.1 | -45.6 | -41.7 | -46.0 | -46.9 | -44.6 | -53.0 | -46.6 | -48.1 | -51.8 | -53.5 | -53.1 |
| -48.0 | -52.6 | -50.3 | -49.4 | -46.1 | -44.6 | | -49.2 | -51.6 | -53.6 | -50.6 | -55.2 | | -53.2 | -49.2 |
| -49.3 | -49.2 | -50.9 | -52.7 | -49.8 | -47.1 | | -48.0 | -53.0 | -43.5 | -54.8 | -50.7 | | -49.3 | -54.6 |
| -47.0 | | | | -51.6 | -49.6 | | -46.0 | -45.0 | -47.9 | -47.2 | -53.0 | | -51.3 | -50.6 |
| -46.7 | -47.5 | -53.7 | -53.8 | -55.5 | -52.7 | -50.5 | -44.0 | -51.9 | -47.8 | -48.2 | -51.2 | -45.9 | -49.8 | -57.2 |

FIG. 6

ELECTRONIC APPARATUS AND SYSTEM

CROSS-REFERENCE TO RELATED APPLICATIONS

This application is a Continuation Application of PCT Application No. PCT/JP2022/033710, filed Sep. 8, 2022 and based upon and claims the benefit of priority from Japanese Patent Application No. 2021-165634, filed Oct. 7, 2021, the entire contents of all of which are incorporated herein by reference.

FIELD

Embodiments described herein relate generally to an electronic apparatus, a system, a method, and a storage medium.

BACKGROUND

In recent years, a fifth-generation mobile communication system (5G) is attracting attention. In addition, with the spread of the 5G, it is predicted that the introduction of mobile edge computing (MEC) will be advancing in factories, distribution centers, and the like. For example, instead of an automatic guided vehicle (AGV) that travels on a predetermined route, an autonomous mobile robot (AMR) that adaptively selects and travels on a route is considered to be the mainstream to transfer a cargo or the like.

At present, not only the transfer robot that autonomously operates but also the transfer robot that operates based on an external instruction is included in the category of the AMR. The latter type of AMR performs communication with an MEC server. More specifically, the AMR performs wireless communication with a base station (access point) installed in a factory or a distribution center, for example.

In order to move the AMR through an appropriate route in a factory, a distribution center, or the like under the control of the MEC server, it is necessary to comfortably perform that communication between the MEC server and the AMR, more specifically, wireless communication between the base station and the AMR all the time. So far, various techniques that comfortably perform wireless communication have been proposed.

As a process that moves the AMR along an appropriate route, there is the case in which a radio wave map on which data relating to received power at points in a factory, a distribution center, or the like is mapped is generated using the AMR regarding wireless communication between the base station and the AMR. In generating the radio wave map, it is important how to interpolate a missing part of data, which possibly occurs on the radio wave map.

BRIEF DESCRIPTION OF THE DRAWINGS

FIG. 4 is a diagram illustrating an example of a radio wave map having missing data.

FIG. 5 is a diagram illustrating an example of a radio wave map including a variation component.

FIG. 6 is a diagram illustrating an example of a radio wave map including a variation component and having missing data.

DETAILED DESCRIPTION

In general, according to one embodiment, an electronic apparatus includes a processor. The processor generates data of a missing part on a radio wave map to which data relating to received power of a radio signal at points in a predetermined geographical range is mapped based on a status of a propagation path between a first wireless device configured to travel in the predetermined geographical range and a second wireless device configured to form a wireless communication area including the predetermined geographical range.

Embodiments will be described hereinafter with reference to the accompanying drawings.

Figure 1:
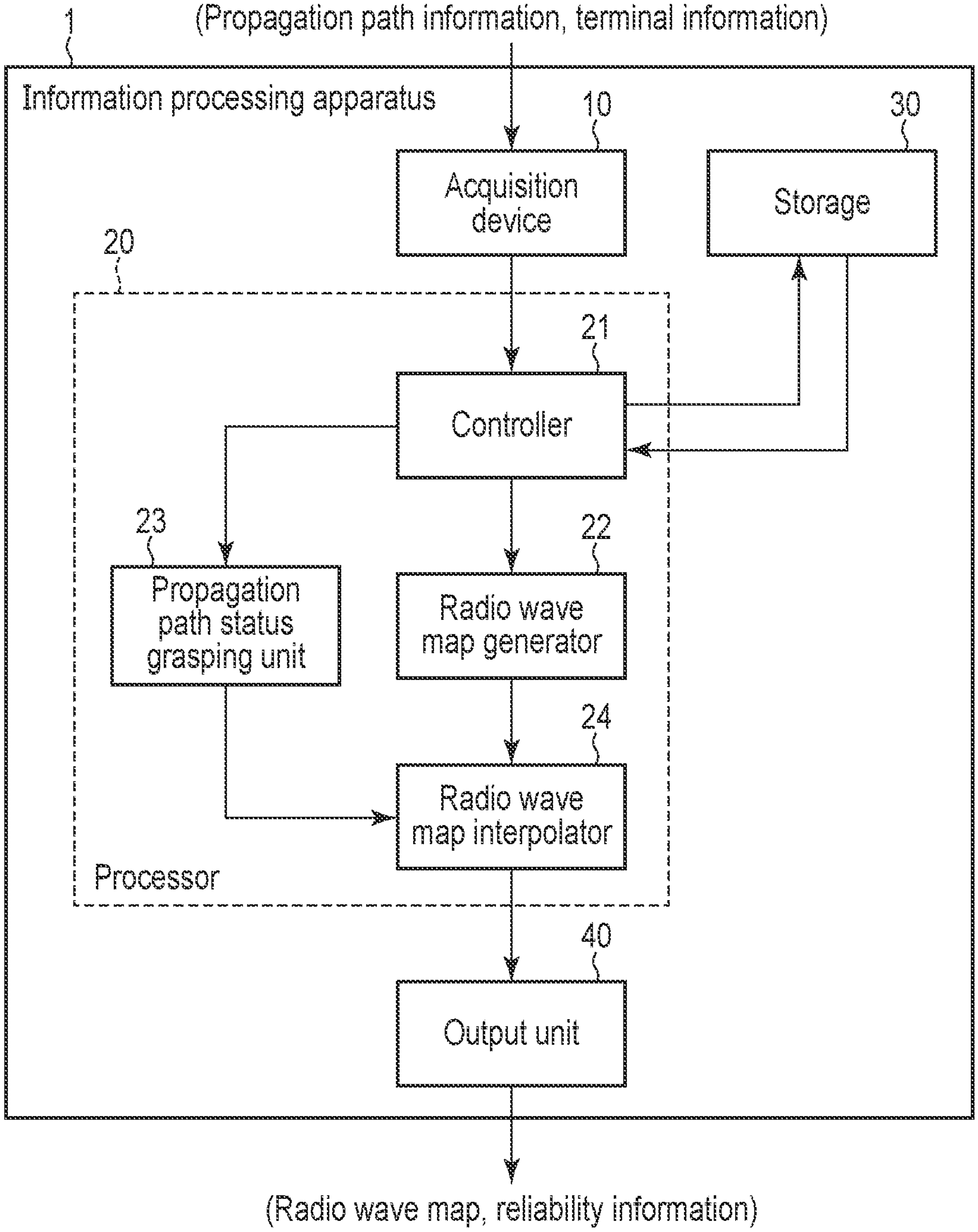
FIG. 1 a diagram illustrating an example of a configuration of an information processing apparatus according to an embodiment.

FIG. 1 is a diagram illustrating an example of a configuration of an information processing apparatus 1 according to an embodiment. Although an example of an application of the information processing apparatus 1 will be described later, the information processing apparatus 1 is an apparatus that generates a radio wave map for AMR route selection in a factory, a distribution center, or the like. The information processing apparatus 1 according to the embodiment has a function of appropriately interpolating a missing part of data on a radio wave map when generating the radio wave map, and this point will be described in detail below.

As illustrated in FIG. 1, the information processing apparatus 1 includes an acquisition device 10, a processor 20, a storage 30, and an output unit 40. In addition, the processor 20 includes a controller 21, a radio wave map generator 22, a propagation path status grasping unit 23, and a radio wave map interpolator 24. Note that the information processing apparatus 1 may be referred to as an electronic apparatus.

The acquisition device 10 is a module that acquires various types of information including propagation path information and terminal information from an AMR that is a mobile body traveling in a predetermined geographical range such as in a factory. The acquisition device 10 acquires various types of information from the AMR through a base station installed in a factory or the like. The base station is a wireless device that forms a wireless communication area including a predetermined geographical range in a factory and the like where the AMR moves. The base station performs wireless communication with an AMR in a wireless communication area, more specifically, with a wireless device mounted on the AMR. The information processing apparatus 1 and the base station may be connected in a wired manner or wireless manner. That is, the concept of the acquisition device 10 includes a module that acquires various types of information by wire and a module that acquires various types of information by radio.

The propagation path information is, for example, information serving as one material that grasps the status of the propagation path of the radio wave between the base station and the AMR at the point at which the AMR is located in the factory. The details of the propagation path information will be described later. The terminal information may be, for example, one or both of the scan data of a laser range finder (LRF) installed on the AMR and the rate of travel and direction data of the AMR.

The processor 20 processes the information acquired by the acquisition device 10. The processor is one or more electronic circuits including a control device and an arithmetic device. The electronic circuit is embodied with an analog or digital circuit or the like. For example, a general-purpose processor, a central processing unit (CPU), a microprocessor, a digital signal processor (DSP), an ASIC, an FPGA, a System-on-a-Chip (SoC), and a combination of these are possible. In addition, at least some of the components in the processor 20 may be executed by these electronic circuits by software or a program.

Although the details of the radio wave map generator 22, the propagation path status grasping unit 23, and the radio wave map interpolator 24 will be described later, first here, the outline of the components in the processor 20 will be described.

The controller 21 causes the storage 30 to hold various types of information acquired by the acquisition device 10, reads the various types of information from the storage 30, and delivers the various types of information to the radio wave map generator 22 and the propagation path status grasping unit 23. The storage 30 is, for example, a volatile storage medium such as a dynamic random access memory (DRAM) or a nonvolatile storage medium such as a hard disk drive (HDD). In the former case, the storage 30 functions as a buffer, and in the latter case, the storage 30 functions as a storage.

The radio wave map generator 22 generates a radio wave map from propagation path information, terminal information (present position of AMR grasped from terminal information), and map information. The radio wave map is, for example, information indicating the distribution of received power in a factory. In other words, for example, the information is information that maps data regarding the received power at the points in the factory. The details of the radio wave map will be described later. The map information is, for example, information regarding a layout in a factory, and information generated from LRF scan data which is one piece of terminal information. The details of the map information will also be described later.

The propagation path status grasping unit 23 grasps (determines) the status of the propagation path from the propagation path information. The radio wave map interpolator 24 interpolates a missing part on the radio wave map generated by the radio wave map generator 22 based on the status of the propagation path. More specifically, the radio wave map interpolator 24 appropriately determines a method of interpolating the radio wave map according to the status of the propagation path. In addition, the radio wave map interpolator 24 calculates the reliability of the interpolated data.

The output unit 40 is a module that outputs various types of information including the radio wave map generated by the radio wave map generator 22 and interpolated with the missing part by the radio wave map interpolator 24, and the reliability information indicating the reliability calculated by the radio wave map interpolator 24. The various types of information can be output by wire or radio. That is, the concept of the output unit 40 includes a module that outputs various types of information by wire and a module that acquires various types of information by radio.

In the information processing apparatus 1 having the above configuration, when the data of the radio wave map is missed and interpolated, a more accurate radio wave map can be reproduced by changing the interpolation method according to the propagation path status. In addition, since it is difficult to perform accurate interpolation in an environment in which there are many multipaths, reliability information is output in association with a radio wave map, and this exerts tan effect that the information can be referred to in AMR route selection performed using the radio wave map.

Figure 2:
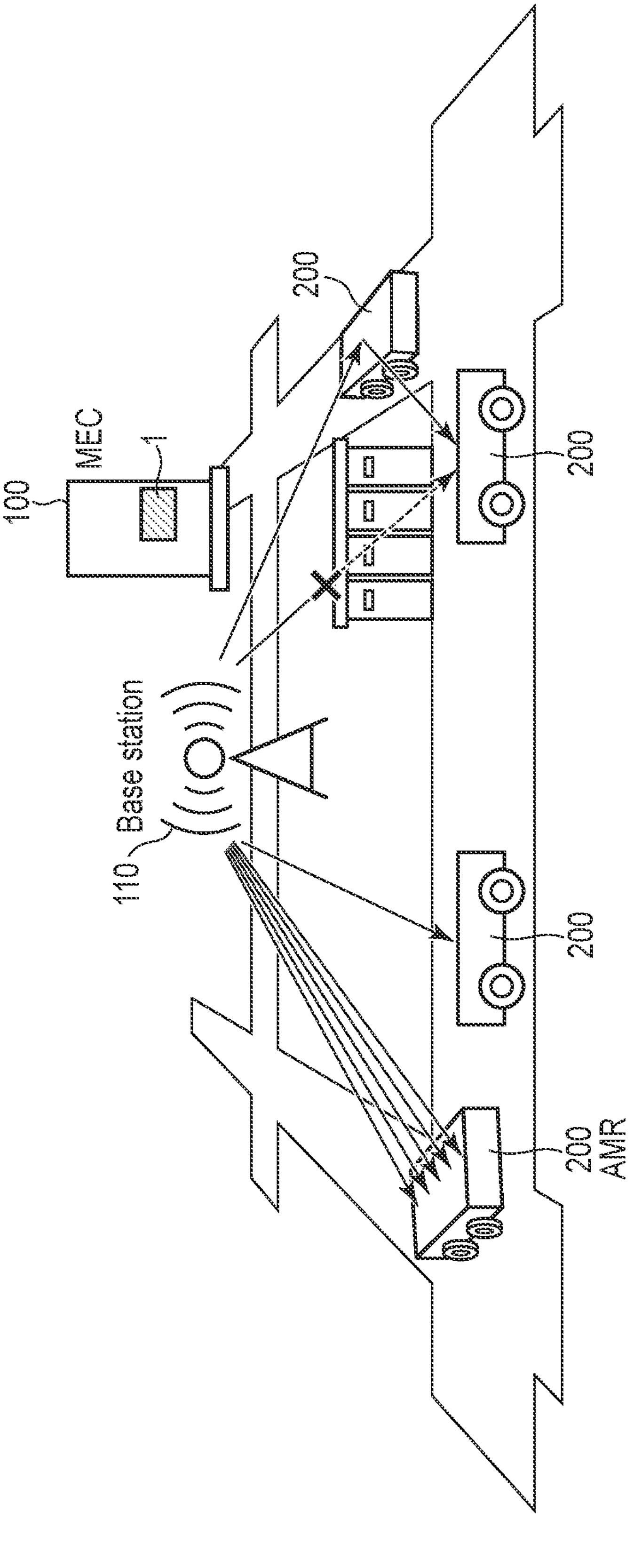
FIG. 2 is a diagram illustrating an example of an application of the information processing apparatus according to the embodiment.

Next, an example of an application of the information processing apparatus 1 according to the embodiment will be described. FIG. 2 is a diagram illustrating an example of an application of the information processing apparatus 1 according to the embodiment.

For example, it is considered that a transfer robot (AMR) moves around in a factory. In the case of moving on a straight line with a limited range along passages, the control may be simple. However, in the case of requiring an advanced movement such as bending a curve or avoiding an obstacle, the control is more advanced. In the case in which such control is performed by wire, problems are considered that the control is limited to a range where the wire reaches, the control becomes ineffective due to disconnection, and the wire is entangled. In particular, in the case of controlling a large number of robots, such a situation becomes remarkable. On the other hand, when control can be performed in a wireless manner, these problems are solved. This wireless control can be performed by, for example, a wireless LAN or Local 5G. Here, the types of robots can be roughly divided into two types, one that operates autonomously and one that operates based on an external command. Although it is useful when the robots can determine the status as in the former, the cost of the robots increases, and the influence is large in the case in which a large number of robots are used. On the other hand, in the latter case, it is possible to reduce the total cost by integrating the functions into a device to be externally commanded. In addition, it is also convenient for management that is capable of collectively grasping information of the robots.

Therefore, here, a system is assumed in which an MEC server 100 integrally controls AMRs 200 through a base station 110. In addition, it is assumed that the information processing apparatus 1 of the embodiment has a function incorporated in the MEC server 100 as a received power data processing apparatus. As a system that controls the AMR 200 in a centralized manner, a cloud system can be assumed as well. In this case, the function of the information processing apparatus 1 is incorporated in a server on the cloud.

Next, the control of the AMR 200 by radio and a radio wave map will be described. Hereinafter, the MEC server 100 and the base station 110 may be collectively referred to as a base station 110 side.

As an example, it is considered that a terminal (AMR 200) is controlled on the base station 110 side using the Local 5G. More specifically, control is performed by the MEC server 100 to move the AMR 200. In order to move the AMR 200 along an appropriate route, the AMR 200 side obtains received power of a signal (downlink [line]) from the base station 110 at locations. The MEC server 100 associates the map information generated by moving around the AMR 200, the estimated position, and the received power, and generates a heat map of the received power at positions, i.e., a radio wave map. The map information, the estimated position, and the received power information are transmitted from the AMR 200 to the base station 110 side in the uplink. The MEC server 100 selects an appropriate route of the AMR 200 based on the information of the radio wave map. For example, since there is a possibility that the AMR 200 becomes uncontrollable at a point of weak received power, it is possible to perform control such that the AMR 200 does not pass through the point.

Next, the preparation of map information and a radio wave map will be described.

In the case in which an environment in which the AMR 200 moves around is a static environment to some extent, fixed map information only has to be held. However, in an environment such as a factory in which the arrangement of objects changes according to time, it is necessary to appropriately update the map information, and the status is different. Therefore, a map is first generated. Under the control of the MEC server 100, the AMR 200 travels in the entire range in which the AMR 200 possibly travels in a transport. The AMR 200 measures time of flight (TOF) by LRF or the like to grasp a distance to a wall or an obstacle. The LRF scan data, the speed, and the (wheel) orientation are transmitted to the base station 110 side in the uplink, and the map and the position of the AMR 200 are grasped. Subsequently, the AMR 200 moves around the entire range again under the control of the MEC server 100 based on the map information, and generates a radio wave map. The base station 110 side broadcasts a synchronization signal, and the AMR 200 receives the synchronization signal and returns received power information such as secondary synchronization signal reference signal received power (SSS-RSRP) and primary synchronization signal reference signal received power (PSS-RSRP) to the base station 110 side in the uplink. At this time, the AMR 200 also transmits the LRF scan data, the speed, and the (wheel) orientation to the base station 110 side, similarly to the time of map generation. This has a meaning of map update from the time of map generation and a meaning of association between received power and a map/self position. Regarding the latter, even though the received power can be measured, the radio wave map has no meaning when the identification of which location is which fails. Note that although the map generation and the radio wave map generation are separated in the above-described procedure, the map generation and the radio wave map generation may be performed simultaneously from the beginning.

Next, the updating of the map information and the radio wave map will be described.

The AMR 200 selects a specific route based on the radio wave map calculated in the above-described preliminary preparation, and starts the actual operation. For example, in a factory, it is conceivable as an example to carry a cargo. Also during the actual operation, the received power and the map/self position are measured in the same manner as described above, and the information is updated. The MEC server 100 may individually hold radio wave maps different in time, may hold only the latest radio wave map, or may merge and hold the latest radio wave map and the most recent radio wave map. The MEC server 100 may determine whether to perform an update based on the reliability information. In addition, in the case in which a plurality of AMRs 200 is operated, the radio wave maps for the AMRs 200 may be merged and stored.

Next, the missing data of the radio wave map will be described.

When the radio wave map is generated by the MEC server 100, the received power data is sometimes missed in some locations. This is considered taking the case of the Local 5G as an example. The base station 110 repeats continuous transmission of the synchronization signal for 5 ms, with an interval of ms, and continuous transmission for 5 ms again. In the case of a frequency of 3 to 6 GHZ and a subcarrier spacing of 15 kHz, 8 synchronization signal/physical broadcast channel (SS/PBCH) blocks are transmitted during 5 ms. Since one PSS and one SSS are included in each SS/PBCH, the AMR 200 can acquire information of PSS-RSRP and SSS-RSRP eight times in 5 ms. Here, it is considered that a radio wave map is generated with pixels of 5 cm square. When the AMR travels at 1 m/s, the time taken to travel by one pixel is 50 ms. That is, since the information of PSS-RSRP and SSS-RSRP is acquired 16 times per pixel, it is sufficient as the information of the received power. However, in order to generate a radio wave map, there is no meaning unless the radio wave map is associated with a location in the map. When the LRF scan data, the received power information, and the self-position information are transmitted in the uplink, the association of these is delayed due to a communication delay caused by a large volume of data, a processing delay in the MEC server 100, and the like, and there is a possibility that a pixel having no information in the radio wave map is generated. In addition, uplink resources have to be allocated in the previous downlink, and depending on the allocated timing, data fails to be immediately transmitted in the uplink at the time of data generation, and may be delayed.

Next, spatial interpolation and a propagation path of the radio wave map will be described.

Figure 3:
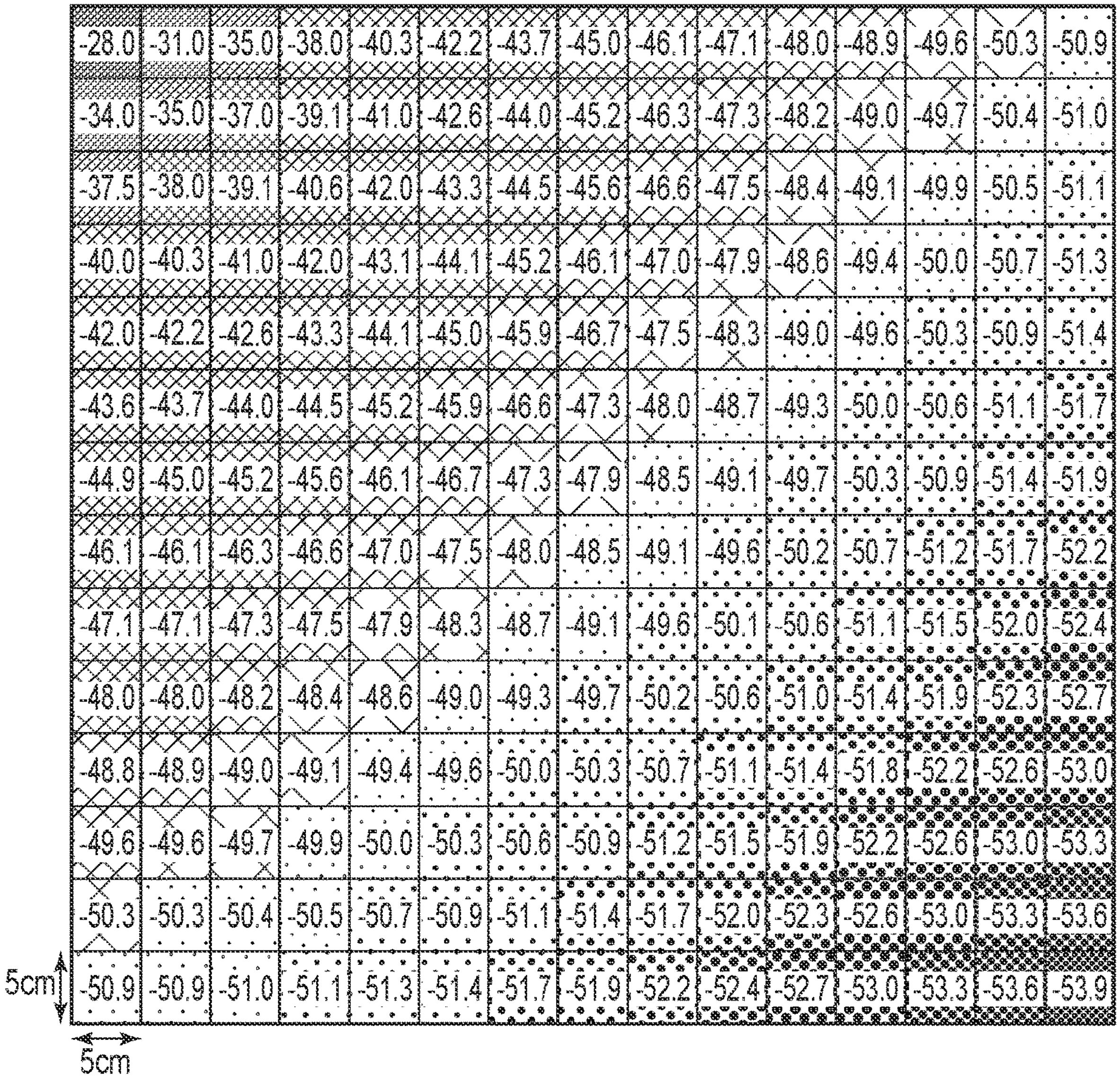
FIG. 3 is a diagram illustrating an example of a radio wave map obtained by a Friis propagation formula.

FIG. 3 is a diagram illustrating an example of a radio wave map on which received power at points is mapped, the radio wave map being obtained by a Friis propagation formula assuming a frequency of 4.8 GHz. In the Friis propagation formula, the received power monotonously decreases to the distance, and a channel in which a direct wave is dominant is simulated. Although it is sufficient that the received power can be acquired for all points as illustrated in FIG. 3, as described above, for example, as illustrated in FIG. 4, missing data may occur in the radio wave map. However, in this case, since the received power monotonously decreases, it is considered that interpolation is easy.

On the other hand, FIG. 5 illustrates the received power obtained by adding a random variation of 0 to 6 dB to the received power obtained by the Friis propagation formula.

In the case in which there is a reflected wave, intensity occurs due to the phase relationship between the direct wave and the reflected wave at the reception point and the phase relationship between the reflected waves, and thus, the received power does not monotonically decrease to the distance. In this state, for example, when missing data occurs in the radio wave map as illustrated in FIG. 6, the difficulty of interpolation increases. That is, the necessity of changing the interpolation method is suggested depending on the status of the propagation path. Note that although the radio wave map in FIGS. 3 to 6 is considered in two dimensions of the xy-plane, the z axis may be added to consider the radio wave map in three dimensions, or the radio wave map in two dimensions of the xy-plane may be considered for each height by slicing the radio wave map in the z axis.

The spatial interpolation and propagation path of the radio wave map will be further described.

In cellular communication, in the case in which the AMR 200 at a speed of 1 m/s moves around, the received power is acquired highly frequently as described above. When uplink communication is performed with no delay, the above-described radio wave map of 5 cm square can be acquired. Based on the received power data finely acquired in each pixel, interpolation can be performed with a certain accuracy in an environment in which a direct wave is dominant. However, such an interpolation approach is not suitable in the case in which there are many multipaths or in the case in which fine spatial resolution is unnecessary.

Here, as a theory of radio wave propagation, there are three concepts of [1] an instantaneous variation (fading), [2] a short-term variation (shadowing), and [3] a long-term variation (propagation distance characteristic). [1] In the instantaneous variation (fading), a section up to several wavelengths is observed with a resolution equal to or less than a wavelength. A spatial standing wave distribution due to incoming multiple waves can be grasped. [2] In the short-term variation (shadowing), a section up to about 100 m is observed with a resolution of 1 to 10 m. In a cellular environment, a degree of shielding from a building or the like changes due to movement, and thus the influence appears depending on a location. [3] In the long- term variation (propagation distance characteristic), a section in the km order is viewed with a resolution of 10 to 100 m. For example, in the macro cell, a macro tendency of attenuation at the power of 3 to 4 can be grasped.

Therefore, the information processing apparatus 1 according to the embodiment appropriately selects a method of interpolating the radio wave map based on the status of the propagation path. That is, the information processing apparatus 1 adaptively uses a method of tracking the instantaneous variation (first variation), a method of tracking the short-term variation (second variation), and a method of tracking the long-term variation (third variation).

Figure 7:
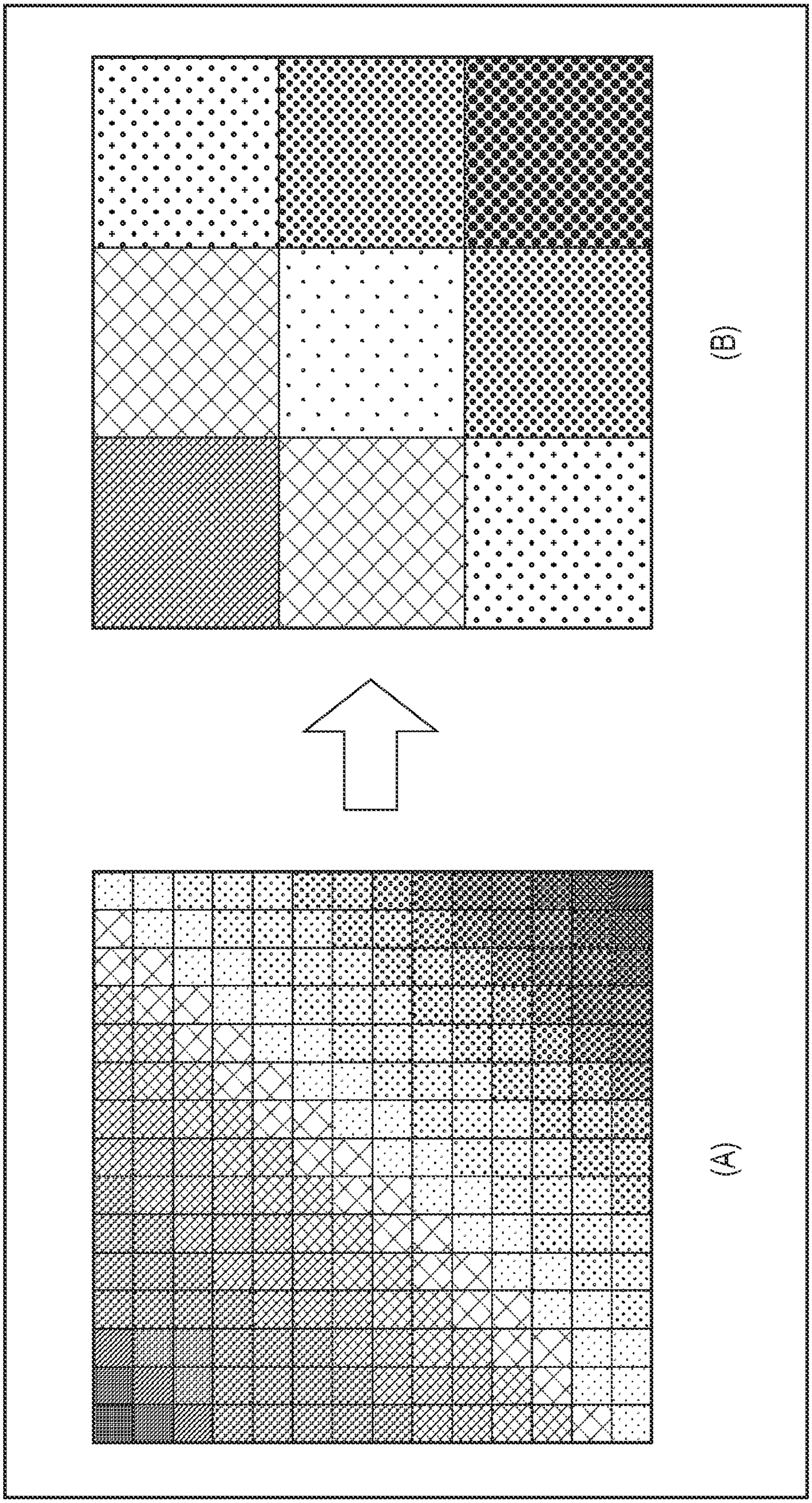
FIG. 7 is a diagram illustrating an example of a radio wave map that tracks short-term variations in comparison with a radio wave map that tracks instantaneous variations.

For example, in the case in which there are many multipaths or fine spatial resolution is unnecessary, the information processing apparatus 1 assumes [2] the short-term variation (shadowing) or [3] the long-term variation (propagation distance characteristic) instead of [1] the instantaneous variation (fading) for the interpolation of the radio wave map. There is a relation between the resolution of the pixel of the radio wave map and [1] the instantaneous variation (fading), [2] the short-term variation (shadowing), and [3] the long-term variation (propagation distance characteristic). In the case in which [2] the short-term variation (shadowing) or [3] the long-term variation (propagation distance characteristic) is assumed, the information processing apparatus 1 changes the resolution of the pixel of the radio wave map from fine resolution (for example, 5 cm) as in (A) to coarse resolution (for example, 1 to 10 m or 10 to 100 m) as in (B) as illustrated in FIG. 7. In addition, the resolution may be changed depending on the location.

The information processing apparatus 1 may change the resolution according to a requirement such as convenience when the radio wave map is used for route selection and whether the radio wave map is in an area in which there is a possibility of collision with an obstacle. In the case in which it is necessary to perform tracking up to instantaneous variation according to a request and the influence of the multipath is large, the information processing apparatus 1 may perform interpolation in a state in which the influence of the multipath is suppressed by a spatial diversity technology using an array antenna or an average of received power in a frequency direction or a time direction, or may use an index of reliability of an interpolated value together.

Next, propagation path information will be described.

The information processing apparatus 1 uses, as the propagation path information, received power measured on the AMR 200 side with a synchronization signal or a reference signal from the base station 110. As the index, reference signal received power (RSRP), received signal strength indicator (RSSI), or the like is used. For example, in the 5G, the synchronization signal from the base station 110 is broadcast, and the terminal (AMR 200) side can acquire the received power of the SSS or the PSS of the synchronization signal.

In addition, in the 5G, a plurality of reference signals such as a channel state information reference signal (CSI-RS) and a demodulation reference signal (DMRS) are prepared, and the information processing apparatus 1 may use received power for each frequency and an impulse response of a propagation path as propagation path information.

The base station 110 side, more specifically, the MEC server 100 acquires information of received power measured on the AMR 200 side in the uplink. The MEC server 100 (the information processing apparatus 1) can use the information on the received power at the points and each time acquired in this manner as one material that grasps the state of the propagation path.

Next, the present position and the map information will be described.

The MEC server 100 receives the LRF scan data, rate of travel, and orientation information of the AMR 200, and grasps the present position and the map information. For example, in the case in which the inside of a factory is assumed, the map information may be sequentially updated with reference to a known initial layout. In addition, as an example, in the case in which the AMR 200 is equipped with two LRFs, i.e., an LRF that looks at the upper part in the height direction and an LRF that looks at the lower part, the MEC server 100 side can grasp piles of loads or obstacles by acquiring these pieces of information. In the propagation path status grasping unit 23 of the information processing apparatus 1, it is difficult to grasp what causes this with only the variation of the propagation path information. However, it is possible to more accurately grasp the status of the propagation path by comprehensive determination in the combination of the map information with the propagation path information.

Supposing that the propagation path information changes due to piles of loads or obstacles, such a method is taken in which the index of the reliability is not lowered and data to be used for interpolation is divided with the point as a boundary. On the other hand, when the propagation path information changes even though no load or no obstacle is piled up, a method of interpolating the received power by lowering the index of the reliability at the point can be employed.

Based on the above, the components of the processor 20 of the information processing apparatus 1 will be described in detail.

First, the radio wave map generator 22 will be described.

The radio wave map generator 22 generates a map in which the position is associated with the received power regarding the range in which the AMR 200 moves around on the map.

Regarding the position, the size of one pixel may be determined and indicated by coordinates from the reference point, or may be indicated by the distance itself. In addition, the resolution may be changed by partially changing the size of one pixel. In addition, the size of one pixel may be determined based on the smallest unit of an obstacle that can be identified. The received power may be replaced with a throughput or a bit error rate.

The radio wave map generator 22 generates the radio wave map in this manner, and thus the radio wave map can be used for the route selection of the AMR 200 having a good communication status between the base station 110 and the AMR 200 performed in the MEC server 100, and a stable operation of the AMR 200 can be embodied.

Next, the propagation path status grasping unit 23 will be described.

Figure 8:
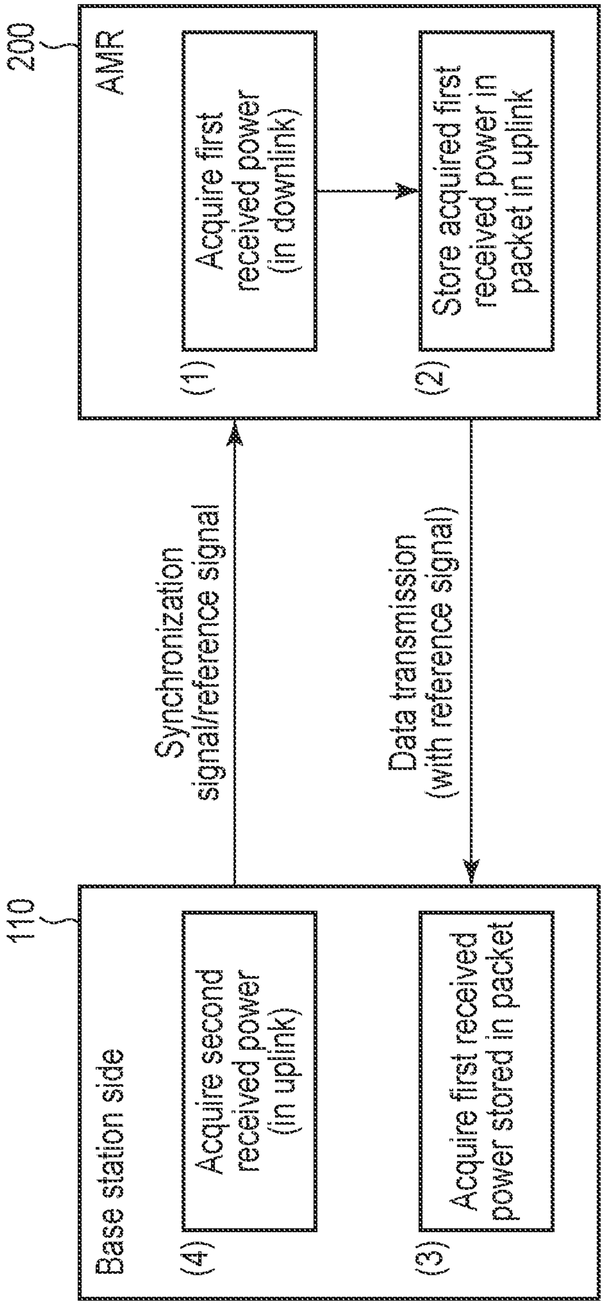
FIG. 8 is a diagram illustrating an example of acquisition of received power in the information processing apparatus according to the embodiment.

FIG. 8 is a diagram illustrating an example of acquisition of received power in the information processing apparatus 1 according to the embodiment.

As illustrated in FIG. 8, the AMR 200 acquires first received power with the synchronization signal/reference signal from the base station 110 side (1). The AMR 200 stores the information in an uplink packet and transmits the uplink packet to the base station 110 side (2). As a result, the base station 110 side can grasp the received power (first received power) at the points (3). In addition, since the reference signal is also added to the uplink packet at this time, the base station 110 side can acquire second received power using this reference signal (4).

In radio wave propagation, the first received power and the second received power are theoretically equal due to duality. Therefore, when there is a large difference between the first received power and the second received power, the propagation path status grasping unit 23 can predict that there is some propagation variation there and can grasp the time variation.

Here, since the difference between the first received power and the second received power is also generated by the movement of the AMR 200, it is desirable to measure the received power in the AMR 200 with a reference signal having a smaller time difference between the time of acquiring the first received power and the time of acquiring the second received power than a synchronization signal to be broadcast. For example, the RSRP of a reference signal CSI-RS is acquired in the downlink, the RSRP of a sounding reference signal (SRS) is acquired in the uplink, and thus it is possible to more appropriately grasp the time variation.

As another method of grasping the time variation, the propagation path status grasping unit 23 may acquire a plurality of first received powers to the minimum resolution of the radio wave map and grasp the difference. As described above, when the radio wave map is generated with pixels of 5 cm square and the AMR 200 travels at 1 m/s, the time taken to travel for one pixel is 50 ms. For example, there is a method of grasping a power difference between synchronization signals acquired a plurality of times during 50 ms. At this time, conversely, the speed of the AMR 200 may be determined in consideration of the interval of the synchronization signal and the size of one pixel. Note that when the time variation is preferentially grasped, the AMR 200 may be moved at a constant speed to temporarily stop the LRF scan data and the position information to be transmitted in the uplink, and to preferentially transmit the received power data instantaneously in the uplink.

As described above, the received power is acquired by oversampling one pixel of the radio wave map, and the variation is seen, and thus the propagation path status grasping unit 23 can grasp whether the propagation path has a large time variation.

In the radio wave propagation, there is an index called a Rician factor representing a ratio of power between a direct wave and a reflected wave. In the case in which the reflected wave intensity is weak, the Rician factor increases, and in the case in which the reflected wave intensity is strong, the Rician factor decreases. For example, the Rician factor of the environment can be derived by comparing the received power of each subcarrier in orthogonal frequency division multiplexing (OFDM) acquired in plurality in terms of time with the received power of the propagation path theoretically derived by swinging a plurality of Rician factors.

Furthermore, when signals are received by an array antenna having a plurality of elements, there is a spatial correlation as an index indicating the similarity of the signals entering each element. It can be determined that the influence of the direct wave is strong in the case in which the spatial correlation is high, and the influence of the direct wave is weak in the case in which the spatial correlation is low.

In this manner, the degree of multiple waves (multipath) can be grasped by the Rician factor and the spatial correlation. In the case in which the influence of the direct wave is strong, the received power tends to monotonously decrease to the distance. In the case in which the influence of the reflected wave is strong, there is a strong tendency that the received power fluctuates to the distance due to the intensification or cancellation of the phases. As the propagation path status grasping unit 23 grasps the status of the propagation path in this manner, the radio wave map interpolator 24 can change the interpolation method based on the grasped status. Note that regarding the classification between the channel in which the direct wave is dominant and the channel in which the reflected wave is dominant, a threshold value may be provided as a Rician factor of X dB or more/or less, or a threshold value may be provided as a spatial correlation Y or more/or less.

In addition, in the 5G, a demodulation reference signal DMRS is arranged in the frequency direction. Using the DMRS, the received power to the frequency and the impulse response of the propagation path can be calculated to grasp the frequency response. In the case of broadband transmission, when the frequency response of the received power is flat, the influence of the direct wave is strong, and when the variation is large, the influence of the multiple wave is strong. When the propagation path status grasping unit 23 grasps the status, the radio wave map interpolator 24 can change the interpolation method according to the status of the propagation path.

Figure 9:
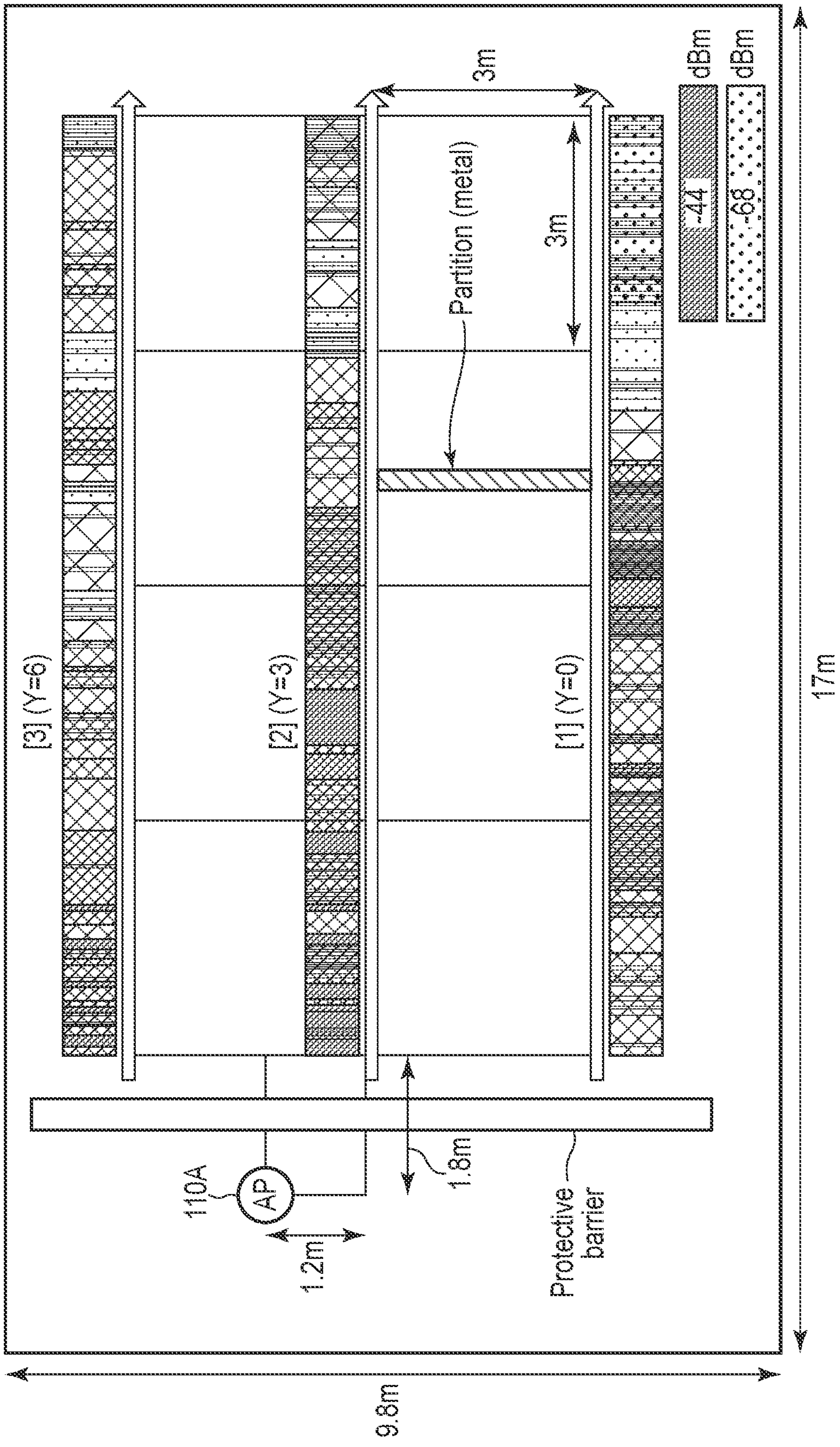
FIG. 9 is a diagram illustrating an example of an actual measurement value of a radio wave map in the information processing apparatus according to the embodiment.

FIG. 9 is a diagram illustrating an example of an actual measurement value of a radio wave map in a certain office environment. Here, an access point (AP) 110A of a 5 GHz band wireless LAN is installed at a height of 1.2 m, and a terminal (AMR 200) that receives a beacon is linearly moved at a constant speed of 0.1 m/s on a route at the height of 0.2 m. Note that diversity is applied with a single antenna on the AP 110A side and with multiple antennas on the AMR 200 side. The received power tends to decrease as the distance from an AP 110A increases in all the three routes.

Figure 10:
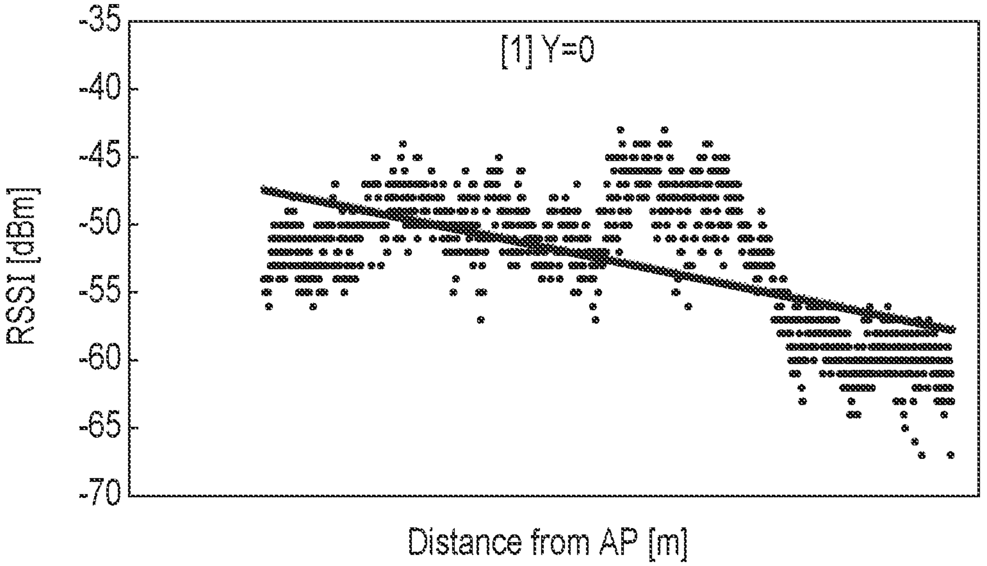
FIG. 10 is a diagram plotting the relationship between a distance from an access point and an RSSI for a route [1] (Y=0) in FIG. 9.
Figure 11:
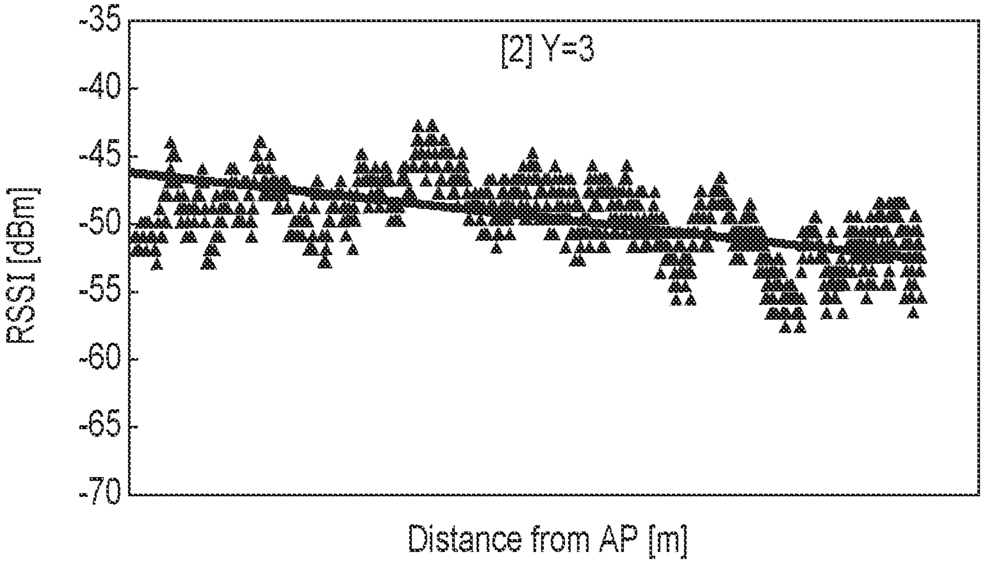
FIG. 11 is a diagram plotting the relationship between a distance from an access point and an RSSI for a route [2] (Y=3) in FIG. 9.
Figure 12:
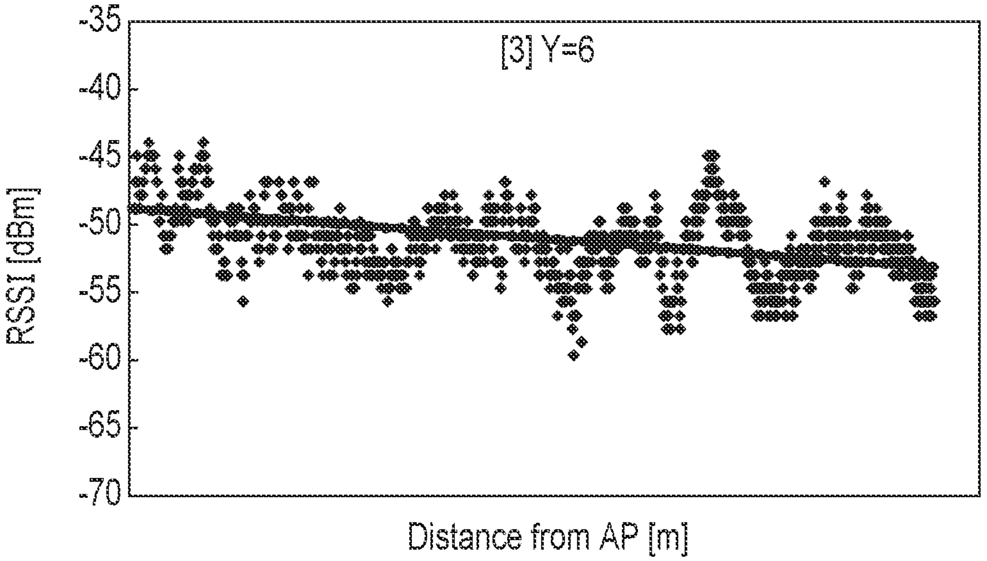
FIG. 12 is a diagram plotting the relationship between a distance from an access point and an RSSI for a route [3] (Y=6) in FIG. 9.

FIGS. 10 to 12 plot the relationship between the distance from the AP and the RSSI for three routes Y=0, 3, and 6 in FIG. 9. Note that the distance from the AP 110A is in the range of 4 to 15 m, and the received power is theoretically proportional to the x-th power of the distance, and thus the received power is plotted as a semi-logarithmic graph. The regression line is also indicated. As illustrated in FIG. 9, Y=3 in FIG. 11 and Y=6 in FIG. 12 are within the line of sight at all reception points, and thus tend to fall within a range of about 5 dB from the regression line and monotonically decrease to the distance. In addition, Y=3 is the 1.2 power law, and Y=6 is the 0.8 power law according to the inclination of the regression line. However, at Y=0 including the line-of-sight/non-line-of-sight, the line-of-sight/non-line-of-sight changes with a partition illustrated in FIG. 9 as a boundary, and thus the tendency greatly changes, and the data may deviate from the regression line by about 10 dB. Therefore, it may be considered that a multiplier of attenuation of radio wave propagation changes with an obstacle as a boundary.

As described above, the propagation path status grasping unit 23 can determine that there is an obstacle at a point at which the attenuation multiplier greatly changes, and in the case in which there is missing data, the radio wave map interpolator 24 can change the interpolation method using the missing data as a boundary.

Next, the radio wave map interpolator 24 will be described.

The radio wave map interpolator 24 interpolates missing data of the radio wave map according to the propagation path status grasped by the propagation path status grasping unit 23. First, the presence or absence of the time variation is confirmed. As described above, the presence or absence of the time variation can be confirmed by the difference in received power between the uplink and the downlink and the difference in oversampled power data of the propagation path status grasping unit 23. In the case in which there is a time variation, the radio wave map interpolator 24 suspects a change in the layout due to an obstacle or the like, and in the case in which there are two or more pieces of LRF scan data and a change in the propagation multiplier as described above, the data to be used for interpolation is divided with an expected obstacle as a boundary. In the case in which there is no change in the LRF scan data and the propagation multiplier, the radio wave map interpolator 24 performs interpolation but reduces the reliability of the interpolated data.

In addition, in the case in which the propagation path status grasping unit 23 determines that there are few multiplexed waves, since the received power monotonously decreases to the distance, the radio wave map interpolator 24 interpolates the data of the radio wave map assuming a wavelength order, i.e., the instantaneous variation (fading). At that time, the radio wave map interpolator 24 may perform linear interpolation with a single logarithm on the horizontal axis as illustrated in FIG. 10, or may perform interpolation based on a regression line drawn from the acquired received power data. The radio wave map interpolator 24 may perform extrapolation from the regression line of the acquired received power data at a location where the number of multiplexed waves is expected to be small in the same manner as well as interpolation. As the distance between the base stations 110 and the AMR 200 increases, the change in the distance between the base stations 110 and the AMR 200 to the movement of the AMR 200 decreases. Using this property, the received power value of the adjacent pixel may be copied. All pieces of actual measurement data do not have to be used for interpolation, and may be divided into data to be used for interpolation and data to be used for verifying the accuracy. The radio wave map interpolator 24 may exclude a plot point greatly deviated from the regression line of the acquired received power data, for example, a plot point deviated by 20 dB from the data used for interpolation as an outlier. At a point of received power close to the minimum reception sensitivity, the radio wave map interpolator 24 may increase the resolution of interpolation or extrapolate a point below the minimum reception sensitivity. In addition, in the case in which the time variation is small and the number of multiplexed waves is small, the radio wave map interpolator 24 increases the reliability of the interpolated data.

Further, in the case in which the propagation path status grasping unit 23 determines that there are many multiplexed waves, the received power greatly fluctuates to the distance, and thus, the radio wave map interpolator 24 interpolates the data of the radio wave map assuming a short-term variation (shadowing) longer than the wavelength order or a long-term variation (propagation distance characteristic) equal to or longer than the wavelength order. At that time, the radio wave map interpolator 24 lowers the spatial resolution of the radio wave map as described with reference to FIG. 7. Linear interpolation may be performed based on the received power values of the adjacent radio wave maps, or the received power itself may be interpolated with the same resolution as that in the case in which there are few multiple waves, using a method such as Kriging, graph theory, or compression sensing, and then the spatial resolution may be lowered to perform averaging. In addition, in the case in which there are many multiplexed waves even though the time variation is small, the radio wave map interpolator 24 lowers the reliability of the interpolated data.

On the other hand, in the case in which the spatial diversity using the plurality of antennas can be utilized on the base station 110 side or the AMR 200 side, or in the case in which the reception signal can be sufficiently averaged in terms of frequency and time by adjusting the bandwidth of the frequency to be used or the speed of the AMR 200, the influence of the multiple waves can be suppressed. Therefore, the radio wave map interpolator 24 may perform linear interpolation with fine resolution as it is, or may increase the reliability of the interpolated data.

The radio wave map interpolator 24 outputs the reliability associated with each pixel of the radio wave map. The radio wave map interpolator 24 may output only points with low reliability. At the time of the interpolation of the radio wave map, the radio wave map is mapped together with the reliability in this manner, and this exerts an effect of enhancing convenience at the time of the route selection of the AMR 200. In the case in which the difference between the first received power and the second received power is large, the radio wave map interpolator 24 may lower the reliability of the pixel of the radio wave map interpolated using the data on the assumption that the influence of the time variation is large. In addition, when interpolation is performed using data of a reception point having a large degree of multiple waves, the radio wave map interpolator 24 may also lower the reliability of pixels.

In addition, the radio wave map interpolator 24 outputs one-dimensional, two-dimensional, or three-dimensional coordinates divided for each pixel and received power corresponding to the coordinates. The radio wave map interpolator 24 may output the correspondence relationship between the distances in the x direction, the y direction, and the z direction from the set origin and the received power.

Figure 13:
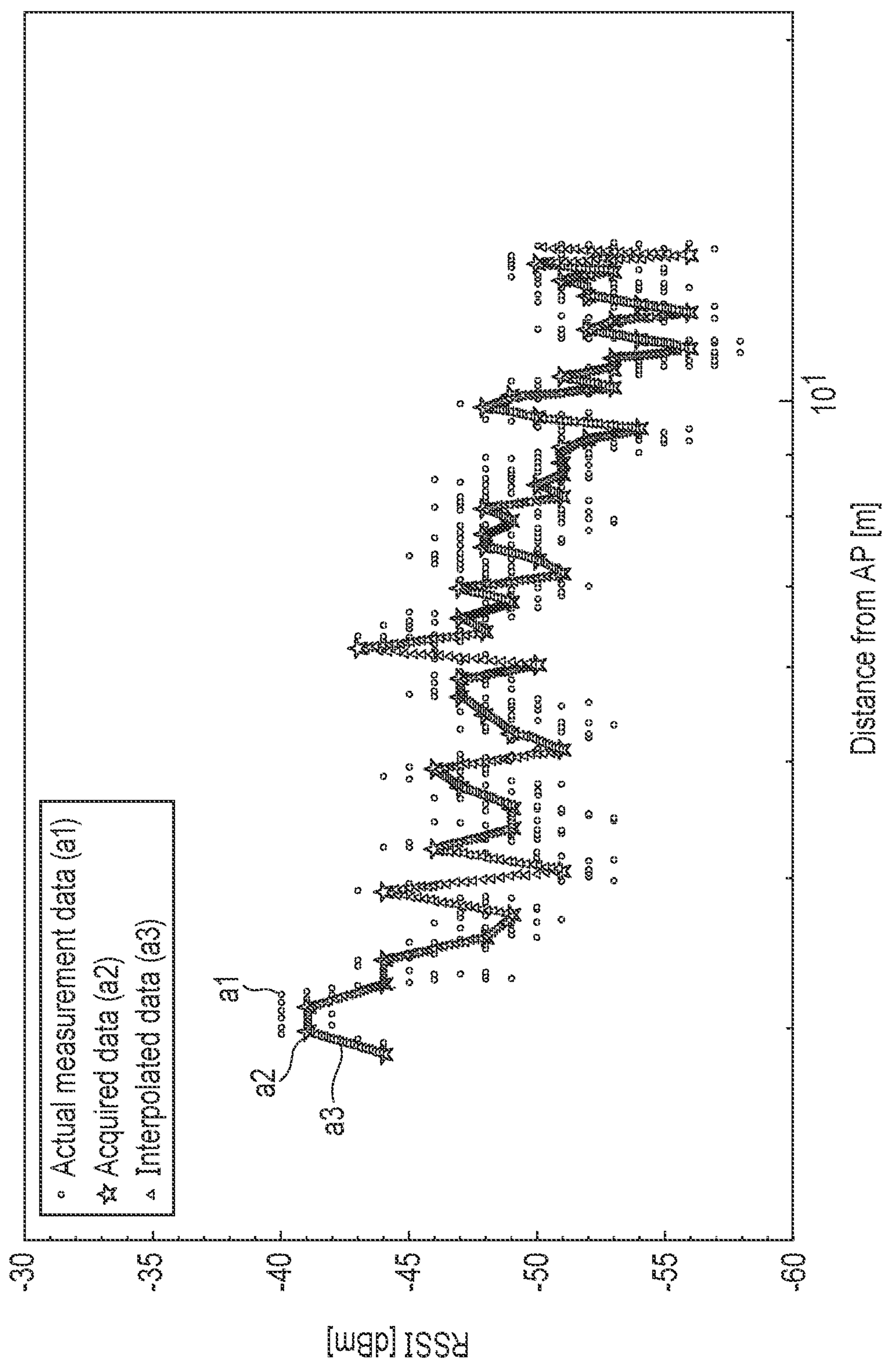
FIG. 13 is a diagram illustrating an example of a result of applying interpolation to the route [2] (Y=3) in FIG. 9.

FIG. 13 illustrates a result of applying interpolation to the route [2] (Y=3) in FIG. 9.

Experimental data is acquired finely every 1 cm on the AMR 200 side. A circle indicated by reference symbol a1 represents this measured value (data). As an example, the case is assumed in which data can be acquired only at intervals of 20 cm on the base station side due to a delay at the time of uplink transmission. A star indicated by reference symbol a2 represents data that was able to be acquired on the base station 110 side. The data interpolated by the information processing apparatus 1 from the data of every 20 cm was compared with the actual measured data of every 1 cm. A triangle mark indicated by reference symbol a3 represents the interpolated data. Note that in this environment, since spatial diversity is also applied within a line of sight, interpolation is performed by linear interpolation.

Figure 14:
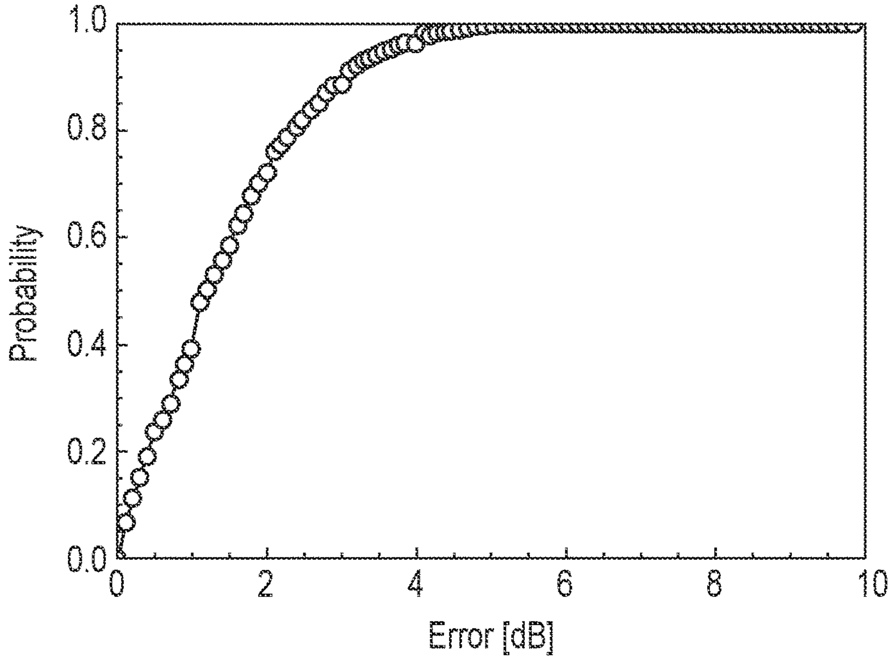
FIG. 14 is a diagram illustrating a cumulative probability the distribution of errors in the interpolation of a radio wave map by the information processing apparatus according to the embodiment.

FIG. 14 is a diagram illustrating the results in a cumulative distribution function (CDF).

In radio wave propagation, 3 dB is a level regarded as an error, and it can be confirmed from FIG. 14 that nearly 90% of data falls within the error of 3 dB. As a result, it can be confirmed that interpolation can be performed with constant accuracy even with simple linear interpolation depending on the status of the propagation path.

Figure 15:
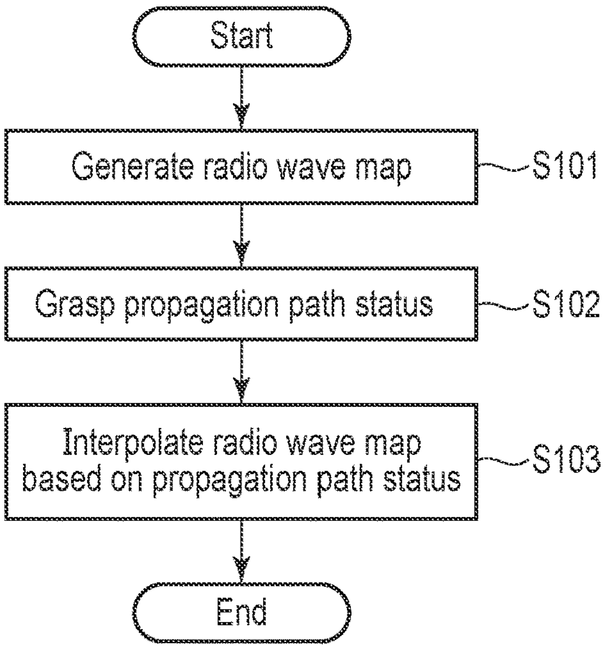
FIG. 15 is a flowchart illustrating an operation procedure of the information processing apparatus according to the embodiment.

FIG. 15 is a flowchart illustrating an operation procedure of the information processing apparatus 1 according to the embodiment. This procedure may be performed in an electronic circuit as described above by a program.

First, the information processing apparatus 1 generates a radio wave map (S101). The information processing apparatus 1 grasps the status of the propagation path between the base station 110 and the AMR 200 (S102). The information processing apparatus 1 interpolates the radio wave map based on the status of the propagation path (S103).

Figure 16:
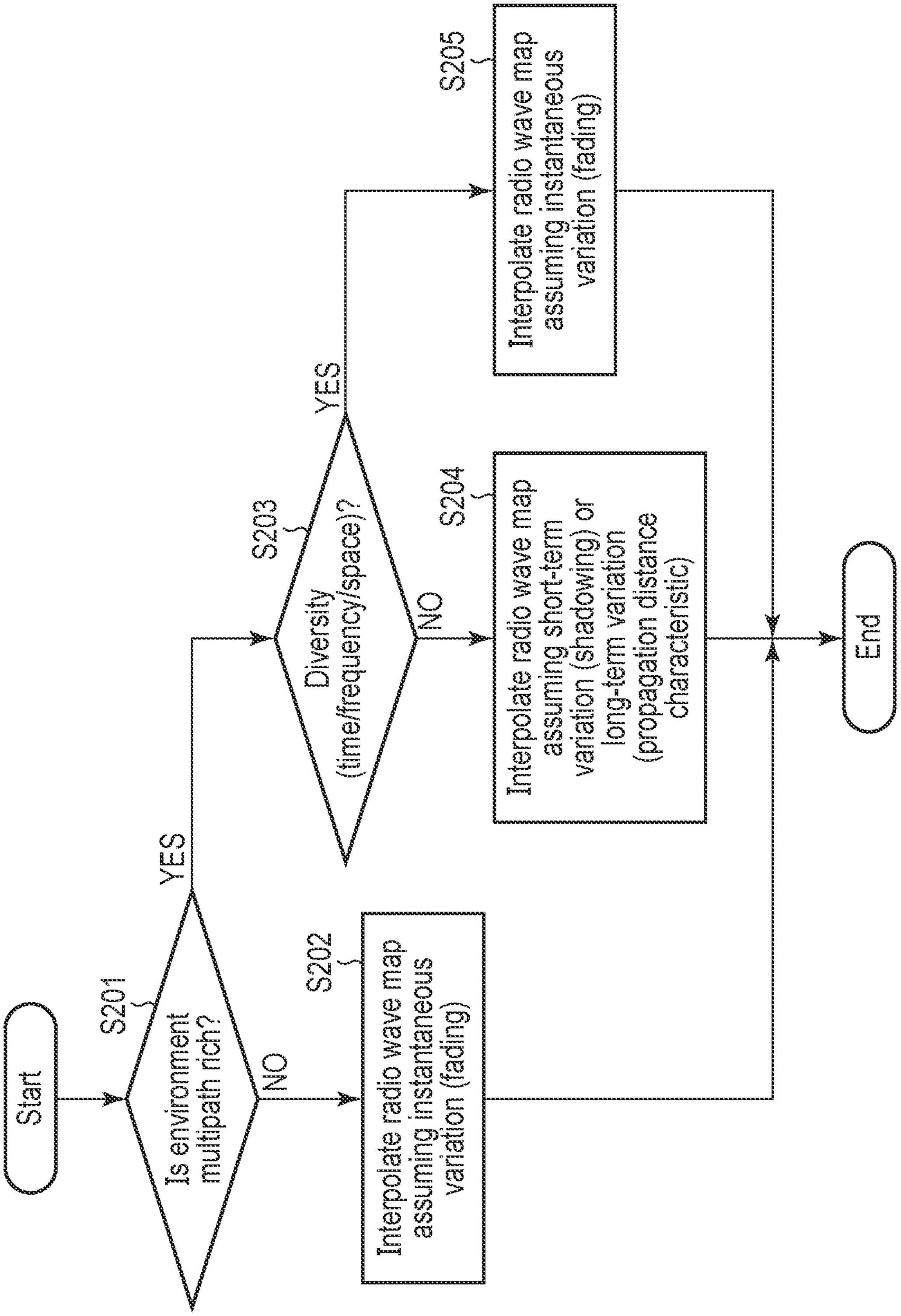
FIG. 16 is a flowchart illustrating a procedure of appropriate use of an interpolation method in the interpolation of a radio wave map in S103 of FIG. 15.

FIG. 16 is a flowchart illustrating a procedure of appropriate use of the interpolation method in the radio wave map interpolation in S103 of FIG. 15.

First, the information processing apparatus 1 determines whether an environment has many multiplexed waves (a multipath rich environment) (S201). In the case of an environment in which there are few multiple waves (S201: NO), the information processing apparatus 1 executes the interpolation of the radio wave map assuming the instantaneous variation (fading) (S202). That is, interpolation is performed with fine granularity.

On the other hand, in the case of an environment with many multiplexed waves (S201: YES), the information processing apparatus 1 determines whether the base station 110 or the AMR 200 applies diversity with multiple antennas (S203). In the case in which no diversity is applied (S203: NO), the information processing apparatus 1 executes the interpolation of the radio wave map assuming the short-term variation (shadowing) or long-term variation (propagation distance characteristic) (S202). That is, interpolation is performed with coarse granularity. Note that as another method in the case in which no diversity is applied, the information processing apparatus 1 may perform interpolation using a method such as Kriging, graph theory, or compression sensing, and then lower the spatial resolution to perform averaging. In this case, interpolation with fine granularity is performed in an environment in which there are many multiple waves and no diversity is applied.

In the case in which diversity is applied (S203: YES), the information processing apparatus 1 executes the interpolation of the radio wave map assuming the instantaneous variation (fading) even in an environment with many multiplexed waves (S202). That is, interpolation is performed with fine granularity.

As described above, the information processing apparatus 1 according to the embodiment can reproduce a more accurate radio wave map by changing the interpolation method of the radio wave map according to the propagation path status. That is, the information processing apparatus 1 according to the embodiment can appropriately interpolate the radio wave map.

(Modifications)

Figure 17:
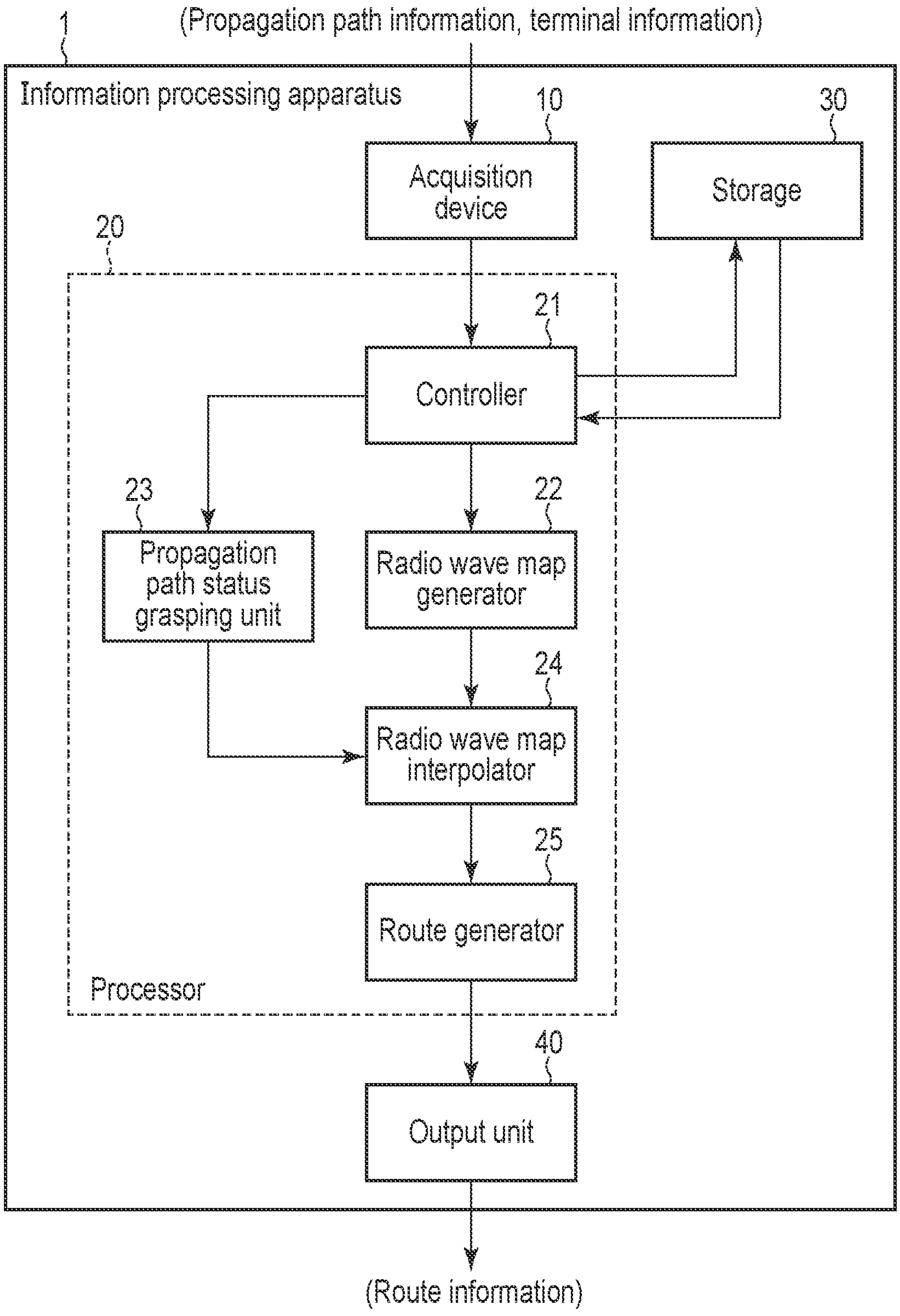
FIG. 17 is a diagram illustrating a modification of the information processing apparatus according to the embodiment.

FIG. 17 is a diagram illustrating a modification of the information processing apparatus 1 according to the embodiment.

In the above description, an example of the information processing apparatus 1 embodied as a received power data processing apparatus that generates a radio wave map and interpolates the radio wave map according to the status of the propagation path is shown. The function of the information processing apparatus 1 as a received power data processing apparatus is incorporated in, for example, the MEC server 100 that centrally manages the AMR 200, and the MEC server 100 executes the route selection of the AMR 200 based on the radio wave map and reliability information output from the information processing apparatus 1.

In an information processing apparatus 1 of a modification illustrated in FIG. 17, a processor 20 further includes a route generator 25. The route generator 25 performs the route selection (route generation) of an AMR 200 based on a radio wave map and reliability information output from a radio wave map interpolator 24.

That is, the information processing apparatus 1 of the modification is embodied as a route generation device that also executes route generation in addition to the received power data processing. An MEC server 100 incorporating the function of the information processing apparatus 1 as a route generation apparatus can obtain route information from the information processing apparatus 1 instead of the radio wave map and the reliability degree information.

Alternatively, it is also possible to consider a modification in which the radio wave map generator 22 is deleted from the processor 20 of the information processing apparatus 1 of the embodiment. That is, the information processing apparatus 1 may be embodied as a received power data processing apparatus that does not have the function of generating the radio wave map but has only the function of interpolating the radio wave map according to the status of the propagation path.

Also in these modifications, the information processing apparatus 1 exerts an effect that can appropriately interpolate the radio wave map.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An electronic apparatus comprising:

a processor configured to generate data of a missing part on a radio wave map to which data relating to received power of a radio signal at points in a predetermined geographical range is mapped based on a status of a propagation path between a first wireless device configured to travel in the predetermined geographical range and a second wireless device configured to form a wireless communication area including the predetermined geographical range, wherein:

the processor is configured to determine the status of the propagation path using received power measured from a synchronization signal or a reference signal transmitted and received between the first wireless device and the second wireless device, and map information in the predetermined geographical range; and the map information is updated at any time based on scan data of one or more laser range finders (LRFs) installed in the first wireless device or a mobile body equipped with the first wireless device.

2. The electronic apparatus of claim 1, wherein the processor is configured to determine the status of the propagation path further based on a difference between first received power measured on a side of the first wireless device and second received power measured on a side of the second wireless device.

3. The electronic apparatus of claim 2, wherein the processor is configured to:

acquire a plurality of the first received powers to a predetermined resolution of the radio wave map, and determine the status of the propagation path further based on a difference between the plurality of the first received powers.

4. The electronic apparatus of claim 3, wherein:

the radio wave map includes a first resolution and a second resolution lower than the first resolution; and the predetermined resolution is the first resolution.

5. The electronic apparatus of claim 1, wherein the processor is configured to determine the status of the propagation path further based on information regarding a direct wave and a reflected wave obtained by a Rician factor or a spatial correlation.

6. The electronic apparatus of claim 1, wherein the processor is configured to generate data of a missing part on the radio wave map based on a first variation of received power or a second variation of the received power in a section longer than the first variation, when the received power of a reflected wave is larger than the received power of a direct wave.

7. The electronic apparatus of claim 1, wherein the processor is configured to output reliability of data of at least the generated missing part in the radio wave map.

8. An electronic apparatus of claim 1, comprising:

a processor configured to generate data of a missing part on a radio wave map to which data relating to received power of a radio signal at points in a predetermined geographical range is mapped based on a status of a propagation path between a first wireless device configured to travel in the predetermined geographical range and a second wireless device configured to form a wireless communication area including the predetermined geographical range, wherein the processor is configured to:

calculate received power for a frequency or an impulse response of the propagation path using a demodulation reference signal (DMRS) transmitted and received between the first wireless device and the second wireless device, and determine the status of the propagation path based on the received power for the frequency or a frequency response obtained from the impulse response of the propagation path.

9. An electronic apparatus comprising:

a processor configured to generate data of a missing part on a radio wave map to which data relating to received power of a radio signal at points in a predetermined geographical range is mapped based on a status of a propagation path between a first wireless device configured to travel in the predetermined geographical range and a second wireless device configured to form a wireless communication area including the predetermined geographical range, wherein the processor is configured to determine the status of the propagation path based on a change in an attenuation multiplier of received power to a distance between the first wireless device and the second wireless device.

10. An electronic apparatus comprising:

a processor configured to generate data of a missing part on a radio wave map to which data relating to received power of a radio signal at points in a predetermined geographical range is mapped based on a status of a propagation path between a first wireless device configured to travel in the predetermined geographical range and a second wireless device configured to form a wireless communication area including the predetermined geographical range, wherein the processor is configured to:

generate first data for a missing part on the radio wave map based on a first variation of received power, when the received power of a direct wave is larger than the received power of a reflected wave, and generate second data for a missing part on the radio wave map based on a second variation of received power in a section longer than the first variation of received power, when the received power of the reflected wave is larger than the received power of the direct wave, and wherein the generation of the second data is performed by lowering a spatial resolution of the radio wave map compared to the radio wave map for performing the generation of the first data.

11. An electronic apparatus comprising:

a processor configured to generate data of a missing part on a radio wave map to which data relating to received power of a radio signal at points in a predetermined geographical range is mapped based on a status of a propagation path between a first wireless device configured to travel in the predetermined geographical range and a second wireless device configured to form a wireless communication area including the predetermined geographical range, wherein the processor is configured to:

generate data of a missing part on the radio wave map based on a first variation of received power, when the received power of a direct wave is larger than the received power of a reflected wave, generate data of a missing part on the radio wave map based on a second variation of received power or a third variation in a section longer than the second variation, when the received power of the reflected wave is larger than the received power of the direct wave, and reduce reliability of data of the missing part, which is generated using data in which a difference between first received power measured on the first wireless device side and second received power measured on the second wireless device side is equal to or greater than a predetermined value, lower than reliability of data other than the missing part, and wherein the second variation is a variation in a section longer than the first variation.

12. An electronic apparatus comprising:

a processor configured to generate data of a missing part on a radio wave map to which data relating to received power of a radio signal at points in a predetermined geographical range is mapped based on a status of a propagation path between a first wireless device configured to travel in the predetermined geographical range and a second wireless device configured to form a wireless communication area including the predetermined geographical range, wherein:

the processor is configured to generate a route on the predetermined geographical range in which the first wireless device has to travel based on the radio wave map obtained by generating and interpolating the data of the missing part; and the electronic apparatus further comprises an output device configured to output the route generated by the processor to the first wireless device.

13. A system comprising:

a first wireless device configured to travel in a predetermined geographical range;

a second wireless device configured to form a wireless communication area including the predetermined geographical range; and the electronic apparatus of claim 1.

* * * * *